(12) United States Patent
Mailliart et al.

(10) Patent No.: US 10,093,582 B2
(45) Date of Patent: Oct. 9, 2018

(54) PROCESS FOR THE MODERATELY REFRACTORY ASSEMBLING OF ARTICLES MADE OF SIC-BASED MATERIALS BY NON-REACTIVE BRAZING IN AN OXIDIZING ATMOSPHERE, BRAZING COMPOSITIONS, AND JOINT AND ASSEMBLY OBTAINED BY THIS PROCESS

(75) Inventors: Olivier Mailliart, Grenoble (FR); Valérie Chaumat, Saint-Paul-de-Varces (FR); Fiqiri Hodaj, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 398 days.

(21) Appl. No.: 12/548,992

(22) Filed: Aug. 27, 2009

(65) Prior Publication Data

US 2010/0055498 A1 Mar. 4, 2010

(30) Foreign Application Priority Data

Sep. 1, 2008 (FR) ..................................... 08 55857

(51) Int. Cl.
*C03B 29/00* (2006.01)
*B32B 27/00* (2006.01)
(Continued)

(52) U.S. Cl.
CPC ............ *C04B 35/44* (2013.01); *C04B 35/195* (2013.01); *C04B 35/22* (2013.01); *C04B 37/005* (2013.01);
(Continued)

(58) Field of Classification Search
CPC ....... C04B 35/565; C04B 37/00; C04B 37/04; C04B 2237/10; C04B 2237/365;
(Continued)

(56) References Cited

U.S. PATENT DOCUMENTS

| | | |
|---|---|---|
| 3,813,759 A | 6/1974 | Heap et al. |
| 4,917,958 A | 4/1990 | Akai et al. |

(Continued)

FOREIGN PATENT DOCUMENTS

| | | | |
|---|---|---|---|
| FR | 2 538 370 A1 | | 6/1984 |
| FR | 2538370 A | * | 6/1984 |

(Continued)

OTHER PUBLICATIONS

JP10194860, machine translation, published Jul. 1998.*

(Continued)

*Primary Examiner* — Alex Efta
(74) *Attorney, Agent, or Firm* — Miles & Stockbridge P.C.

(57) ABSTRACT

Process for the moderately refractory assembly of at least two articles made of silicon carbide-based materials by non-reactive brazing in an oxidizing atmosphere, in which the articles are placed in contact with a non-reactive brazing composition and the assembly formed by the articles and the brazing composition is heated in an oxidizing atmosphere at a brazing temperature sufficient to melt the brazing composition so as to form a moderately refractory joint, wherein the non-reactive brazing composition is a composition A composed of silica ($SiO_2$), alumina ($Al_2O_3$) and calcium oxide (CaO), or alternatively a composition B composed of alumina ($Al_2O_3$), calcium oxide (Cao) and magnesium oxide (MgO).

Brazing suspension, paste comprising a powder of said brazing composition and an organic binder.

Refractory joint and assembly.

28 Claims, 1 Drawing Sheet

(51) Int. Cl.

| | |
|---|---|
| *B29C 65/00* | (2006.01) |
| *C04B 35/44* | (2006.01) |
| *C04B 35/195* | (2006.01) |
| *C04B 35/22* | (2006.01) |
| *C04B 37/00* | (2006.01) |

(52) U.S. Cl.
CPC ......... *C04B 2235/3206* (2013.01); *C04B 2235/3208* (2013.01); *C04B 2235/3454* (2013.01); *C04B 2235/3463* (2013.01); *C04B 2235/5244* (2013.01); *C04B 2235/5248* (2013.01); *C04B 2235/616* (2013.01); *C04B 2237/062* (2013.01); *C04B 2237/064* (2013.01); *C04B 2237/10* (2013.01); *C04B 2237/365* (2013.01); *C04B 2237/38* (2013.01); *C04B 2237/708* (2013.01); *C04B 2237/82* (2013.01); *Y10T 156/10* (2015.01)

(58) Field of Classification Search
CPC ....... C04B 2337/062; C04B 2237/064; C04B 2235/3481; C04B 35/03; C04B 35/10; C04B 35/14; C04B 35/18; C04B 35/20; C04B 35/22; C04B 37/005; C04B 37/045; C04B 2237/06; C04B 2237/82; C03C 8/02; C03C 3/04; C03C 3/076; C03C 3/083; C03C 3/087; B32B 17/06; B23K 35/24
USPC ........................................................ 156/60
See application file for complete search history.

(56) References Cited

U.S. PATENT DOCUMENTS

| | | | | |
|---|---|---|---|---|
| 4,973,564 | A | * | 11/1990 | Chyung et al. .............. 501/32 |
| 5,080,977 | A | * | 1/1992 | Zaplatynsky ................ 428/432 |
| 5,447,683 | A | | 9/1995 | Montgomery et al. |
| 5,560,993 | A | | 10/1996 | Morimoto et al. |
| 5,975,407 | A | | 11/1999 | Gasse et al. |
| 6,716,512 | B2 | * | 4/2004 | Yamamoto et al. .......... 428/116 |
| 6,790,126 | B2 | * | 9/2004 | Wood et al. .................. 451/41 |
| 7,318,547 | B2 | | 1/2008 | Gasse |
| 2002/0010066 | A1 | * | 1/2002 | Nakashima et al. ........... 501/69 |
| 2003/0038166 | A1 | | 2/2003 | Gasse |
| 2003/0205003 | A1 | * | 11/2003 | Carman et al. ............... 51/293 |
| 2005/0079343 | A1 | | 4/2005 | Raybould et al. |
| 2005/0127146 | A1 | | 6/2005 | Chaumat et al. |
| 2005/0158534 | A1 | * | 7/2005 | Tabuchi et al. ............. 428/304.4 |
| 2005/0167409 | A1 | | 8/2005 | Knorr et al. |
| 2006/0162849 | A1 | | 7/2006 | Han |
| 2008/0057268 | A1 | * | 3/2008 | Lu ...................... C04B 35/195 428/116 |

FOREIGN PATENT DOCUMENTS

| | | | | |
|---|---|---|---|---|
| GB | 1274709 | A | * 5/1972 | ............ C21B 11/02 |
| JP | 61-169189 | A | 7/1986 | |
| JP | 10-194860 | A | 7/1998 | |
| JP | 10194860 | A | * 7/1998 | |
| JP | 2828750 | B2 | * 11/1998 | |
| JP | 2007-246319 | A | 9/2007 | |
| JP | 2007246319 | A | * 9/2007 | |

OTHER PUBLICATIONS

JP2007246319, machine translation, pubhlished Sep. 2007.*
Rankin et al., "Calciumoxyd-Aluminiumoxyd-Magnesiumoxyd", Zeitschrift Fur Anorganische Und Allegemeine Chemie, vol. 96, No. 1, 1916, pp. 291-316, XA-002522702.
"Flouine Compounds, Organic to Gold and Gold Compounds", Kirk-Othmer Encyclopedia of Chemical Technology, 3$^{rd}$ Edition, vol. 11, 1980 (John Wiley & Sons), pp. 826 and 827, XP-002522703.
Levin et al., "Phase Diagrams for Ceramists", The American Ceramic Society, 1982, p. 209 and 200, XP002522704.
Hanson et al., "Active Metal Brazing: The Role of the Braze Alloy," Proceedings from Materials Solutions Conference '99 on Joining of Advanced and Specialty Materials, vols. 1-4, 1999, pp. 53-57.
Fernie et al., "Ceramic Reinforced Metal Braze Alloys for Joining Silicon Carbide", British Ceramic Proceedings, No. 60, pp. 317-318, 1999.
Prakash et al., "Microstructural Characterization of SiC Ceramic and SiC-Metal Active Metal Brazed Joints", Scripta Materialia, vol. 52, 2005, (Elsevier Ltd.), pp. 1169-1173.
Lemoine et al., "Vitreous Joining Process of SiC$_f$/SiC Composites", Journal of the European Ceramic Society, No. 16, 1996, (Elsevier Science Ltd.), pp. 1231-1236.
Ferraris et al., "Glass-Ceramic Joining and Coating of SiC/SiC for Fusion Applications", Journal of Nuclear Materials, Nos. 258-263, 1998, (Elsevier Science B.V.), pp. 1546-1550.
Katoh et al., "Microstructure and Mechanical Properties of Low-Activation Glass-Ceramic Joining and Coating for SiC/SiC Composites", Journal of Nuclear Materials, Nos. 283-287, 2000, (Elsevier Science B.V.), pp. 1262-1266.
Perham et al., "Joining of Silicon Carbide with a Cordiente Glass-Ceramic", Journal American Ceramic Society, No. 82, 1999, pp. 297-305.
Tamari et al., "Joining of Silicon Carbide Ceramics with $Si_3N_4$—$Y_2O_3$—$La_2O_3$—MgO Mixture", Yogyo-Kyokai-Shi 94, 1986, p. 1087.
Lee et al., "Joining of Silicon Carbide Using MgO—$Al_2O_3$—$SiO_2$ Filler", Journal of Materials Science, No. 33, 1998, pp. 5007-5014.
Lippmann et al., "Laser Joining of Silicon Carbide—a New Technology for Ultra-High Temperature Resistant Joints", Nuclear Engineering and Design, No. 231, 2004, (Elsevier Science B.V.), pp. 151-161.
Database WPI Week 198637, Thomson Scientific, London, GB XP-002526446 (1986), p. 1.
European Search Report dated Mar. 31, 2010 for related European Application No. 09 16 9048.

* cited by examiner

PROCESS FOR THE MODERATELY REFRACTORY ASSEMBLING OF ARTICLES MADE OF SIC-BASED MATERIALS BY NON-REACTIVE BRAZING IN AN OXIDIZING ATMOSPHERE, BRAZING COMPOSITIONS, AND JOINT AND ASSEMBLY OBTAINED BY THIS PROCESS

TECHNICAL FIELD

The present invention relates to a process for the moderately refractory assembling of articles made of silicon carbide-based materials by non-reactive brazing in an oxidizing atmosphere, more precisely in an atmosphere containing oxygen, especially in air, with a non-reactive brazing composition, in order especially to produce components based entirely on silicon carbide.

The invention also relates to brazing suspensions, pastes, slurries comprising a powder of said brazing compositions and an organic binder, and to the moderately refractory assembly and joint obtained by this process.

The term "silicon carbide-based material" generally means a material whose SiC content is greater than or equal to 50% by mass, preferably greater than or equal to 80% by mass and more preferably 100% by mass: in the latter case, it may be said that the material is constituted or composed of silicon carbide.

These silicon carbide-based materials may especially be pure silicon carbide such as pure α silicon carbide (α-SiC) or β silicon carbide (β-SiC) or SiC-based composite materials such as composites with silicon carbide fibres and/or with a silicon carbide matrix.

The silicon carbide-based material may be in the form of silicon carbide fibres or silicon carbide powder that is sintered or bound by a ceramic binder.

The technical field of the invention may be defined as being that of brazing using temperatures generally from 1100° C. to 1650° C.

The assemblies concerned by the present invention are generally considered as "moderately refractory", i.e. the maximum working temperatures of these assemblies are generally up to 1250° C. and are generally between 850° C. and 1200° C. as a function of the composition of the brazing alloy or of the brazing composition.

These assemblies may be included in the manufacture of components of complex shapes requiring both very good mechanical strength between the silicon carbide-based substrates and satisfactory sealing on either side of the joint.

STATE OF THE PRIOR ART

It is known that it is difficult to manufacture large-sized ceramic articles, in particular made of SiC. The reason for this is that the tolerances after sintering of large-sized silicon carbide primary components are poorly mastered and the machining of these components is unacceptable for cost reasons.

Moreover, and for the same reasons, it is generally difficult to manufacture articles of complex shape with silicon carbide-based compounds.

It is thus often preferable to manufacture articles or structures of large size and/or of complex shape from ceramic elements of simple shape and/or of small size, and then to assemble these elements to produce the final structure.

Such a technique is especially necessary for manufacturing structures such as heat exchangers, burners, heat resistances of components of silicon carbide structure having a working temperature, for example, of up to 1200° C.

Due to the high temperatures, for example in the region of 1000° C., used in the applications of ceramics such as silicon carbide, assembly of these ceramics by bonding with organic adhesives is excluded, since the working temperatures of this type of assembly cannot exceed a maximum of 200° C.

Purely mechanical assembling, for example by stapling or screwing, affords an only partial and random contact between the articles. The assemblies thus obtained cannot be leaktight.

Moreover, standard assembling techniques by welding involving an energy beam with or without a supply of metal (TIG, electron-beam or laser-beam welding) and involving partial fusion of the parts to be assembled are unusable for the assembling of ceramics due to the fact that a ceramic substrate or article cannot be melted and that, in particular, silicon carbide decomposes before melting.

Common techniques for performing refractory assembling of ceramics are solid-state diffusion welding and sintering or cosintering assembly.

In assembly by diffusion welding, a pressure is applied at high temperature to the interfaces to allow atomic inter-diffusion between the two substrates. The temperature must always remain below the melting point of the least refractory material, and there is therefore no liquid phase in the system. This type of assembly is performed either in a press in a single direction, or in an isostatic chamber. Diffusion welding is particularly suited to assembly between two metal alloys and poorly suited to the assembling of ceramic materials since the atoms constituting the ceramic diffuse very sparingly in the region of the joint. In addition, the process is mechanically prohibitive, since it requires the compression of porous and fragile substrates and materials such as silicon carbide-based substrates, which risk being greatly damaged during this mechanical compression loading.

The sintering or cosintering assembly of SiC articles also requires high pressures, but also high temperatures and long stages (plateaus), since this process is based on the principle of inter-diffusion between the SiC elements.

In other words, solid-state diffusion welding and sintering assembly have the drawback of being constraining from the point of view of their implementation, since:

for solid-state diffusion welding, the shape of the articles must remain simple if uniaxial pressing is used, or alternatively complex tooling and a complex preparation are necessary, comprising, for example, the manufacture of an envelope, leaktight vacuum closure, hot isostatic pressing, and final machining of the envelope, if HIP (Hot Isostatic Pressing) is used;

in the case of cosintering or sintering assembly, the same problems remain (shape of the articles, complexity of implementation) with, in addition, the need to control the sintering of an added powder to be intercalated between the two materials to be assembled;

these two techniques also require the use of long stages (one to several hours) at high temperature since the processes used involve solid-state diffusion.

It emerges from the foregoing, and in summary, that in order especially to ensure good mechanical strength and satisfactory leaktightness of the assembly, only processes using a liquid phase, such as brazing, may be envisaged.

Brazing is a relatively inexpensive technique that is easy to perform and that is the one most commonly used. Articles of complex shape may be made by brazing, and brazing operations are limited to placing between (brazing of "sandwich" type) the articles to be assembled or close (brazing of capillary type) to the joint between the two articles, a brazing alloy, known as a braze, or an added alloy, this alloy being capable of wetting and of spreading over the interfaces to be assembled to fill the joint between the articles and to melt this alloy. After cooling, the braze solidifies and gives the assembly cohesion.

Many brazing compositions for articles made of silicon carbide-based materials are sparingly refractory. They are generally brazing compositions formed from metal alloys having a melting point that is lower, or even very much lower, than 1000° C. [1, 2, 3]. Such a melting point is largely insufficient for applications at high temperatures in the region of 1000° C. or more, for example up to 1250° C.

It should also be noted that these brazes cannot be used in air, due to problems of oxidation of the braze.

Moreover, most of the chemical elements that form part of these metallic brazing compositions are highly reactive with silicon carbide at and above 500° C. and create fragile compounds.

Consequently, in the case of brazing performed above 1000° C., such brazing compositions or brazing alloys would chemically attack silicon carbide-based materials.

In addition, the least reactive alloys are also the least refractory, for instance the alloy AgCuTi with an Ag—Cu matrix and a Ti active element in low concentration. For the applications more particularly targeted by the invention, which are those of a moderately refractory assembly, with a working temperature of the assembling that may generally be up to 1250° C., all brazing compositions formed mainly of silver or silver-copper, copper, nickel, iron or cobalt, platinum, palladium or gold must therefore be excluded on account of their high reactivity and due to the fact that it is impossible to use them in air.

In order to solve the problems posed by brazing compositions formed from metal alloys and especially from reactive metal alloys, silicon-based brazing compositions or brazing alloy formulations with a melting point above 1200° C. [4, 5, 6] have been proposed.

These brazing alloys formed from metal silicides have the advantage of satisfactorily wetting silicon carbide under vacuum or in a neutral atmosphere, while at the same time being very sparingly reactive, and of ensuring a good leaktight mechanical interface between silicon carbide-based substrates. However, the brazing process using these silicon-based brazing compositions cannot be performed in air.

The reason for this is that oxidation of the brazes and of the SiC takes place in air, preventing good wetting. Consequently, silicon-rich brazing compositions and brazing alloys are unsuitable for brazing at a temperature above 1000° C. in air.

Moreover, brazing compositions and brazing alloys based on a mixture of oxides, for the assembly of silicon carbide-based materials, have been proposed.

With such brazing compositions, the brazing process is, in the majority of cases, performed in a protective atmosphere, for example of a neutral gas, or under vacuum, between 700 and 1600° C. depending on the composition of the brazing alloy.

Ferraris et al. have thus performed the assembly under argon of SiC/SiC composites with alloys such as the alloy $ZnO—B_2O_3—MgO—SiO_2—Al_2O_3—Na_2O$ performed at 1200° C. [7] and the alloy 49.77 CaO-50.23 $Al_2O_3$ (mass %) performed at 1500° C. [8, 9].

Document FR-A-2 538 370 also describes the brazing under argon at 1400° C. of SiC with a brazing composition composed of $SiO_2—Al_2O_3—MgO—Y_2O_3$, the mass percentage composition of which is as follows: 32.5%≤$SiO_2$+ MgO≤77.5%; 17.5%≤$Al_2O_3$≤62.5%; 5%≤$Y_2O_3$≤50%) [10].

Perham et al. have performed the brazing of SiC under vacuum between 1465° C. and 1550° C. with the brazing composition 52.5% $SiO_2$-32.0% $Al_2O_3$-13.5% MgO-2.0% BaO [11].

Tamari et al. propose a brazing composition based on $Si_3N_4—Y_2O_3—La_2O_3$—MgO for brazing silicon carbide between 1600 and 1800° C. under argon [12].

Finally, Lee et al. [13] describe the brazing of SiC under argon between 1350° C. and 1530° C. using a braze having the composition 60 $SiO_2$-25 $Al_2O_3$-15 MgO (mass %).

In summary, few studies present operations for the brazing of silicon carbide in an oxidizing atmosphere, especially in air. The results of brazing in argon or under vacuum cannot be transposed to an oxidizing atmosphere, especially air, in particular as regards the physicochemical behaviour with respect to the environment (diffusion of oxygen into the glass mixture, etc.).

Finally, the brazing in air of silicon carbide starting with a mixture of oxides was performed by Lipmann et al. [14, 15]. These authors propose a process of assembly in air of SiC by laser-assisted brazing with a brazing composition of the $Y_2O_3—SiO_2—Al_2O_3$ system or of the $ZrO_2—SiO_2—Al_2O_3$ system.

The main drawback of the laser-assisted brazing process used in these documents is that it is not suited to all geometries and/or sizes of articles to be assembled. In particular, the laser-assisted brazing process is not suitable for large-sized articles, more specifically for articles comprising large surface areas to be brazed, and/or articles of complex shape.

Thus, the surface areas assembled in documents [14, 15] are very small, of the order of 1 $cm^2$.

Moreover, this laser-assisted brazing process is expensive.

Finally, the brazing compositions described in documents [14] and [15] withstand high temperatures, i.e. temperatures above 1600° C., and consequently require that the brazing operations also be conducted at high temperature, which entails the risk of degrading the SiC-based material to be brazed such as sintered SiC or an SiC-based composite, if the residence time at these high temperatures is not of limited duration, since oxidation of the SiC then takes place precisely due to the fact that the brazing is performed in air.

It may be stated that the brazing compositions described in documents [14] and [15] are limited to a very localized and very rapid use for small surface areas to be brazed. This therefore greatly restricts the applications of the brazing compositions described in documents [14] and [15].

In the light of the foregoing, there is thus a need for a process for performing, in an oxidizing atmosphere and especially in air, the brazing at a temperature above 1100° C. of articles, parts, made of silicon carbide-based materials, irrespective of their size and/or shape, and thus for obtaining a moderately refractory assembly, i.e. with a maximum working, use, temperature that may be up to 1250° C., for example between 850° C. and 1200° C.

There is in particular a need for a brazing process, and for the associated brazing composition, for performing in an oxidizing atmosphere, especially in air, the moderately refractory brazing of silicon carbide-based articles of large sizes and/or of complex geometries, especially having large surface areas to be brazed.

There is also a need for a brazing assembly process and for the associated brazing composition that simultaneously ensure leaktightness of the joint between two articles made of silicon carbide-based material, good filling of the joint by the braze, and also satisfactory mechanical strength of the assembly above 500° C. and up to 850° C., or even 1200° C. or 1250° C., depending on the brazing composition.

In other words, there is currently an unsatisfied need for a brazing process and for the associated brazing composition, which make it possible to perform, by brazing in an oxidizing atmosphere, especially in air, between two SiC-based materials, strong but also moderately refractory bonds, i.e. bonds that can especially withstand temperatures that may be up to 850° C. and even beyond, i.e. 1200° C. or 1250° C.

None of the brazing processes and of the brazing compositions described in the documents of the prior art satisfies the needs listed above.

In particular, none of the processes and compositions of the prior art simultaneously fulfils the following criteria, exposed by the inventors, and which are fundamental for producing structural components made of ceramic, such as SiC, involving moderately refractory joints:

1) the brazing composition should make it possible to produce a strong bond between the two articles, parts, made of silicon carbide-based material, which implies a non-reactive brazing composition, i.e. a composition that is chemically compatible with silicon carbide, and that does not form fragile compounds therewith;

2) the brazing composition should fundamentally be compatible with an oxidizing brazing atmosphere formed, for example, by a gas containing oxygen such as air or oxygenated argon, and should not be degraded thereby;

3) the brazing composition should satisfactorily wet the silicon carbide and adhere well thereto;

4) the brazing composition should be compatible with all heating devices, especially rapid and/or localized heating devices;

5) the brazing composition should have a coefficient of expansion suited, matched to SiC, i.e. close to the coefficient of expansion thereof, to eliminate any residual stress that may appear in the joint during cooling and to ensure that there is no initiation of cracks, which would be harmful to the mechanical strength of the assembly;

6) the brazing composition should be formed from a limited number of elements, in order to facilitate its preparation and implementation;

7) the joint should be moderately refractory, i.e. with a brazing temperature generally from 1100° C. to 1650° C. enabling it to withstand customary, use, temperatures generally from 850° C. to 1200° C. and higher, for example 1250° C., while at the same time not being too refractory so as not to have an excessively high brazing temperature that is possibly liable to cause oxidation of the composition in an oxidizing atmosphere and especially in air.

Finally, the process and the associated brazing should allow the brazing and assembly of any type of silicon carbide-based material and should be readily adaptable to any specific silicon carbide-based ceramic.

The aim of the invention is thus to provide a process for the assembly by brazing of articles, parts, or components made of silicon carbide-based materials, which meets, inter alia, the needs mentioned above, which satisfies, inter alia, all of the requirements and criteria mentioned above, which eliminates the drawbacks, faults and limitations encountered with the processes of the prior art, and which makes it possible especially to produce moderately refractory high-strength joints that are free of cracks both during the production of the joint and under the working conditions.

DESCRIPTION OF THE INVENTION

This aim, and others, are achieved in accordance with the invention by a process for the moderately refractory assembling of at least two articles made of silicon carbide-based materials by non-reactive brazing in an oxidizing atmosphere, in which the articles are placed in contact with a non-reactive brazing composition, and the assembly formed by the articles and the brazing composition is heated in an oxidizing atmosphere to a brazing temperature that is sufficient to melt the brazing composition in order to form a moderately refractory joint, wherein the non-reactive brazing composition is a composition A composed of (consisting of) silica ($SiO_2$), alumina ($Al_2O_3$) and calcium oxide (CaO), or alternatively a composition B composed of (consisting of) alumina ($Al_2O_3$), calcium oxide (CaO) and magnesium oxide (MgO).

The process according to the invention, which is a process of brazing in an oxidizing atmosphere, especially in air, using a specific brazing composition composed of (consisting of) three specific oxides including alumina and calcium oxide, has never been disclosed in the prior art. In particular, the specific brazing composition used according to the invention, which, surprisingly, allows the brazing in an oxidizing atmosphere, especially in air, of articles, parts, made of silicon carbide-based materials, is not in any way mentioned in the prior art documents cited hereinabove.

The process according to the invention meets the needs and satisfies all the requirements and criteria mentioned above, and does not have the drawbacks of the processes of the prior art.

In particular, the process according to the invention allows for the first time the preparation in an oxidizing atmosphere, especially in air, of moderately refractory assemblies (i.e. assemblies with an operating temperature above 850° C., or even 1200° C., depending on the brazing composition) of articles, parts, made of silicon carbide-based materials irrespective of their geometry, even of very complex geometry, and/or of their size.

The process according to the invention especially ensures in all cases good leaktightness of the joint, good filling of the joint with the braze and also excellent mechanical strength of the assembly above 500° C.

The process according to the invention is also simple, reliable, easy to implement and inexpensive overall.

In other words, the many surprising advantages and effects of the invention may be listed as follows, without this list being considered as limiting:

the assembly obtained according to the invention makes it possible to ensure very good mechanical attachment between the silicon carbide-based substrates for maximum working, use, temperatures ranging, for example, from 850° C. to 1200° C. depending on the brazing composition or the brazing alloy composition. Breakages take place in "cohesive" mode, i.e. cracks occur in the silicon carbide-based substrates and not at the interface;

similarly, the brazed joints obtained according to the process are leaktight. The process is consequently suited to sealing operations that need to withstand maximum temperatures, for example between 850° C. and 1200° C. depending on the composition of the brazing alloy;

extremely moderate reactivity of the brazing alloy on the silicon carbide-based substrates has been observed. There are no complex and porous embrittling zones at the interface;

another noteworthy property of the process is the homogeneity of the joint obtained after brazing;

the process according to the invention allows brazing in an oxidizing atmosphere and especially in air, which greatly reduces the financial costs of the process when compared with processes in which the brazing operation is performed in an oven under a protective atmosphere, for example in argon, or under vacuum;

the process of brazing in an oxidizing atmosphere, especially in air, according to the invention may also be performed by applying a rapid heating technique such as induction heating and/or localized heating.

The behaviour of the brazing compositions, in particular of the brazing compositions for brazing in an oxidizing gaseous atmosphere, especially in air, and even more particularly for the brazing of SiC, is extremely unpredictable and cannot in any way be deduced from the behaviour of the known brazing compositions, even similar ones.

There was nothing to indicate that the use of the specific composition according to the invention in a process for the brazing of SiC-based articles could allow brazing in an oxidizing gaseous atmosphere, especially in air, with all the benefits and advantages listed hereinabove.

The results obtained during brazing in argon or under vacuum cannot be transposed to brazing in an oxidizing atmosphere, especially in air, in particular as regards the physicochemical behaviour with respect to the environment, and, for example, the diffusion of oxygen in the glass mixture.

The oxidizing atmosphere is generally an atmosphere containing oxygen, such as an atmosphere of air, of oxygenated argon or of oxygenated helium (mixture of argon and oxygen or of helium and oxygen).

Advantageously, composition A may be composed (may consist), as mass percentages, of 75% to 7% $SiO_2$, 60% to 6% $Al_2O_3$ and 60% to 10% CaO.

This advantageous range or domain of mass percentages for composition A may be divided into three sub-domains No. 1, No. 2 and No. 3.

In sub-domain No. 1, composition A is composed (consists), as mass percentages, of 70% to 55% $SiO_2$, 22% to 8% $Al_2O_3$ and 35% to 15% CaO.

The preferred compositions of this sub-domain No. 1 of composition A are close to or correspond to the following composition: a composition composed (consisting), as mass percentages, of 62% $SiO_2$, 15% $Al_2O_3$ and 23% CaO.

In sub-domain No. 2, composition A is composed (consists), as mass percentages, of 55% to 38% $SiO_2$, 25% to 12% $Al_2O_3$ and 45% to 30% CaO.

The preferred compositions of this sub-domain No. 2 of composition A are close to or correspond to the following composition: a composition composed (consisting), as mass percentages, of 42% $SiO_2$, 20% $Al_2O_3$ and 38% CaO.

In sub-domain No. 3, composition A is composed (consists), as mass percentages, of 38% to 8% $SiO_2$, 55% to 8% $Al_2O_3$ and 55% to 28% CaO.

The preferred compositions of this sub-domain No. 3 of composition A are close to or correspond to the following composition: a composition composed (consisting), as mass percentages, of 22% $SiO_2$, 37% $Al_2O_3$ and 41% CaO.

Advantageously, composition B is composed (consists), as mass percentages, of 70% to 35% $Al_2O_3$, 65% to 25% CaO and 20% to 1% MgO.

The preferred compositions of this sub-domain of composition B are close to or correspond to the following composition: a composition composed (consisting), as mass percentages, of 50.5% $Al_2O_3$, 44.0% CaO and 5.5% MgO.

The various compositions A and B defined by the advantageous, preferred and specific percentages specified hereinabove are not, a fortiori, either described or suggested in the prior art.

It is optionally possible to add titanium oxide $TiO_2$ to the brazing compositions used according to the invention, in particular to the compositions A.

Titanium oxide may be generally added in a proportion of 1% by mass to 10% by mass of the total mass of the composition, for example of composition A.

It is also optionally possible to add boron oxide $B_2O_3$ to the brazing compositions used according to the invention in order to lower their melting point.

Boron oxide may be generally added in a proportion of 1% by mass to 10% by mass of the total mass of the composition.

The process according to the invention is generally performed by forming a powder of brazing composition, suspending this powder in an organic binder so as to obtain a suspension, slurry or paste, and coating at least one surface of the articles, parts, to be assembled with the suspension or paste obtained.

A surface to be assembled of at least one of the articles, parts, to be assembled may be coated with the suspension, slurry or paste, and the surfaces of the articles, parts, to be assembled may then be placed in contact so that the suspension, slurry or paste is intercalated (sandwiched) between them, or alternatively the articles, parts, to be assembled are placed in contact while keeping them offset so as to create a surface capable of receiving the suspension, slurry or paste close to the joint formed by the surfaces to be assembled of the articles, parts, to be assembled, and the suspension, slurry or paste is then applied to this surface.

The brazing may be performed at a brazing temperature of 1100° C. to 1650° C. and preferably from 1350° C. to 1650° C., for a time of 1 to 240 minutes and preferably from 2 to 30 minutes.

The brazing temperature (or more exactly the temperature of the brazing stage) that is particularly recommended is between 1350° C. and 1650° C., and the duration of the brazing stage that is particularly recommended is between 2 and 30 minutes.

However, it is possible, for certain compositions, to form a brazed joint at lower temperature, for example at 1100° C. for a brazing stage time of 120 minutes. However, the mechanical strength of the joint will be lower than when brazing at higher temperature is performed (see Example 2). This brazing at lower temperature may satisfy certain applications that require brazing at moderate temperature.

The assembly formed by the articles and the brazing composition may be brought to the brazing (stage, plateau) temperature by introducing it directly into a device, such as an oven, that has already been brought to the brazing temperature, or alternatively the assembly formed by the articles and the brazing composition is brought to the brazing temperature by applying a temperature rise from room temperature.

The invention also relates to a brazing suspension, slurry, paste comprising a powder of a non-reactive moderately refractory brazing composition chosen from a composition A composed of (consisting of) silica ($SiO_2$), alumina ($Al_2O_3$) and calcium oxide (CaO) and a composition B composed of (consisting of) alumina ($Al_2O_3$), calcium oxide (CaO) and magnesium oxide (MgO); and an organic binder.

The invention also relates to the brazing suspensions, slurries, pastes comprising a powder of the advantageous, preferred and specific brazing compositions defined by particular mass percentages of each of the oxides that have been described hereinabove in the context of the presentation of the process according to the invention; and an organic binder.

As has also been stated hereinabove, boron oxide and/or titanium oxide may optionally be added to the brazing compositions.

The invention also relates to the moderately refractory joint, and to the assembly comprising at least two articles, parts made of SiC-based materials, obtained by the process according to the invention, described above.

Other characteristics and advantages of the invention will emerge more clearly on reading the description that follows, which is given as a non-limiting illustration in relation with the attached drawings, in which:

DETAILED DESCRIPTION OF PARTICULAR EMBODIMENTS

Figure 1:
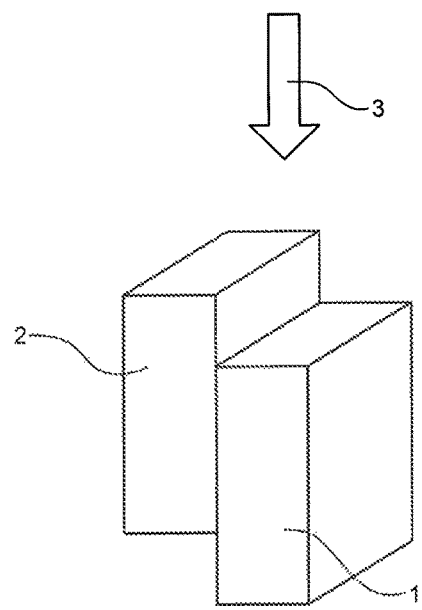
FIG. 1 is a schematic view of the specimens, test pieces, used for the mechanical tests, especially shear tests, of the joints and assemblies prepared in the examples.

The first step of the process according to the invention generally consists, first, in preparing or producing a brazing composition, in other words a brazing alloy. The brazing alloy according to the invention is a ternary alloy, either of the silica ($SiO_2$)-alumina ($Al_2O_3$)-calcium oxide (CaO) system (brazing composition A), or of the alumina ($Al_2O_3$)-calcium oxide (CaO)-magnesium oxide (MgO) system (brazing composition B). The preferred mass proportions for each of the compositions A and B have been mentioned above.

The brazing composition is generally a pulverulent composition, which may be prepared by first synthesizing, from the various pure oxides and/or from compounds composed of several of these oxides, a glass containing these oxides.

Examples of such compounds formed from several oxides are mullite, which is the compound $3Al_2O_3\text{-}2SiO_2$, the compound $CaO\text{—}Al_2O_3$ and the compound $CaO\text{—}SiO_2$.

These pure oxides or compounds are generally in the form of powders. They are weighed out following the proportions desired in the final brazing composition that it is desired to obtain, and they are then mixed together and ground in any suitable apparatus, such as a mortar.

For an alloy of the $SiO_2\text{—}Al_2O_3\text{—}CaO$ system, the braze is prepared either from silica powder, mullite (defined compound $3Al_2O_3\text{-}2SiO_2$) powder and powder of the compound $CaO\text{—}SiO_2$ (for example for composition A1), or from alumina powder and powder of the compound $CaO\text{—}SiO_2$ (for example for composition A2), or from powder of the compound $CaO\text{—}SiO_2$ and of the compound $CaO\text{—}Al_2O_3$ (for example for composition A3).

For an alloy of the system $Al_2O_3\text{—}CaO\text{—}MgO$, the braze is prepared from CaO, MgO, $Al_2O_3$ and $CaO\text{—}Al_2O_3$ powders.

It is possible to improve the properties of the glasses of the $SiO_2\text{—}Al_2O_3\text{—}CaO$ system (brazing composition A) by crystallizing them by adding titanium oxide $TiO_2$, which is a nucleating agent. Typically, a few mass % of $TiO_2$ will be added, for example from 1% to 10% by mass of $TiO_2$ relative to the total mass of the brazing composition. On the other hand, glasses of the $Al_2O_3\text{—}CaO\text{—}MgO$ system generally crystallize without this addition. It should also be noted that the melting point of these brazing alloys, whether it is the brazing composition A or the brazing composition B, may be reduced if need be by adding boron oxide $B_2O_3$, in a proportion, for example, of from 1% to 10% by mass of $B_2O_3$ relative to the total mass of the brazing composition.

The mixture of ground powders is then introduced into a crucible generally made of platinum, and the various constituents of the powder mixture are melted by subjecting them, for example, to a stage of 4 hours in air at 1590° C. or 1640° C. depending on the composition of the brazing alloy. After cooling, a homogeneous glass whose melting point generally ranges between 1200° C. and 1600° C., depending on its composition, is obtained.

The glass obtained is recovered and then ground in a mortar or any other device suitable for obtaining a powder of suitable particle size whose grains have, for example, a diameter of from 10 to 250 μm.

The ground glass is then conventionally mixed with a cement or a liquid organic binder that is generally both viscous and tacky so as to obtain a paste that allows uniform spreading onto the surfaces of the silicone carbide-based substrates to be brazed.

Such a binder or cement generally decomposes, for example, between 100 and 300° C. without leaving traces. It may be, for example, a cement of Nicrobraz® type.

Experiments involving applying a drop ("goutte posée" in French) of this glass onto SiC were performed in air between 1100° C. and 1590° C. They showed, surprisingly, firstly, that it is possible to reach within a few minutes contact angles below 60° and, secondly, that the SiC/glass bonds formed are strong.

The second step of the process according to the invention generally consists in performing the actual brazing assembly.

Prior to assembling, the two (or more) surfaces of the articles made of SiC-based materials to be assembled are generally degreased in an organic solvent, for instance a ketone, an ester, an ether, an alcohol or a mixture thereof, etc., a preferred solvent being acetone or an acetone-ethyl alcohol-ether mixture, for example in ⅓, ⅓, ⅓ proportions; and then dried.

There are generally two articles, parts, made of SiC-based materials to be assembled, but a larger number of articles, which may be up to 100, may also be simultaneously assembled.

The expression "article, part, made of SiC-based materials" generally means any element or species of any size or shape included, for example after assembly with one or more other articles, parts, in structures of larger size.

According to the invention, it is possible to assemble, with excellent results each time, articles of complex geometry or shape and/or of large size.

The term "silicon carbide-based material" generally means herein any material comprising at least 50% by mass of silicon carbide, preferably at least 80% by mass of silicon carbide and more preferably 100% by mass of silicon carbide; in the latter case, the material is made, composed, consists solely of silicon carbide.

As has already been stated hereinabove, the silicon carbide-based materials may be chosen from pure silicon carbides such as pure α silicon carbide (α-SiC) or β silicon carbide (β-SiC) and SiC-based composite materials such as composites with silicon carbide fibres and/or with a silicon carbide matrix.

As examples of SiC-based materials, mention may be made of pure dense silicon carbide or pressureless sintered silicon carbide (PLS—SiC); Si-infiltrated silicon carbide (known as SiSiC or RBSC containing 5% to 20% Si); porous recrystallized silicon carbide (known as RSiC); silicon graphite (C—SiC) formed of graphite and covered with a layer of SiC having a thickness, for example, of 0.1 to 1 mm; and also SiC/SiC composites, for example containing fibres or "whiskers"; C/SiC composites, for example, containing carbon fibres or "whiskers" and an SiC matrix; and also SiC monocrystals; and SiC composites with another ceramic, for example $SiC/Si_3N_4$ and SiC/TiN.

The two or more articles to be assembled may be made of the same material, based on silicon carbide, for example made of PLS (pressureless sintered) α-SiC, or made of SiC—SiC composite, or each of the articles may be made of a different material.

The suspension, slurry or paste of the brazing composition described previously is spread, coated or applied, preferably uniformly, onto the surface of at least one of the articles made of silicon carbide-based material to be assembled, and the surfaces of the two articles to be assembled are then placed in contact. This brazing configuration is known as the "sandwich configuration" since the paste of the brazing composition is placed directly between the surfaces of the articles, parts, to be assembled.

The amount of paste, slurry or suspension of brazing composition to be used in this configuration is generally from 4 $mg/cm^2$ to 17 $mg/cm^2$, for example 11 $mg/cm^2$.

Alternatively, the surfaces of the articles to be assembled are brought together so as to leave a gap generally of 1 to 200 μm, which will be filled by capillary effect with the brazing composition, the latter being placed close to the gap to be filled, in a space or reservoir made for this purpose, the said reservoir possibly being of millimetric size in accordance with the knowledge of a person skilled in the art in this field.

This brazing configuration is known as the "capillary configuration". With the brazing compositions according to the invention, it is possible to perform such capillary brazing, i.e. infiltration of the braze into the brazing joint, without directly placing the brazing composition between the articles to be assembled as in the case of the sandwich configuration.

The amount of paste or suspension of brazing composition to be used in this capillary configuration is generally from 4 $mg/cm^2$ to 17 $mg/cm^2$, for example 11 $mg/cm^2$.

The articles ready to be brazed are then placed in a heating device such as an oven or subjected to heating by any other suitable means.

In accordance with the invention, the brazing is performed in an oxidizing atmosphere such as an atmosphere containing oxygen, for example in air, and the heating device such as an oven, for example, is in an atmosphere of air, oxygenated argon or oxygenated helium.

The articles to be assembled are subjected, for example in the oven, to a brazing heating cycle in an oxidizing atmosphere, especially in air.

Thus, the assembly formed by the articles and the brazing composition may be brought to the brazing temperature (brazing stage, plateau) by applying a temperature rise that is preferably "slow", with one or more temperature ramps from room temperature.

This temperature rise may take place, for example, with a temperature ramp at a rate of 400° C./minute.

The brazing stage, plateau, is generally effected at a temperature corresponding to the melting point of the chosen brazing composition, but this temperature is preferably a temperature at least 25° C. higher than this melting point.

Depending on the compositions, the brazing temperature will thus range, for example, from 1350° C. to 1650° C.

Such a melting point of the compositions allows, according to another advantage of the process of the invention, use of the assembly, especially, in air, for example up to 850° C. and even up to 1200° C.

The brazing time, i.e. the heating cycle for performing the assembling, is, according to the invention, generally short. The duration of the brazing stage is generally from 2 to 30 minutes.

This duration may be increased slightly for very large articles to be brazed, and may then be up to 200 minutes, or even 240 minutes.

However, it is possible, for certain compositions, to form a brazed joint at a lower temperature than the particularly recommended temperature mentioned above, below the melting point, in the viscous range of the glass, for example at 1100° C. for a brazing stage time that is then longer and that may be up to 120 minutes. However, the mechanical strength of the joint will be lower than in the case of brazing at higher temperature (see Example 2). This brazing at lower temperature may satisfy certain applications that require brazing at moderate temperature.

It is also possible to introduce directly, "rapidly", the articles to be assembled, ready to be brazed, into a device such as an oven already brought to the brazing stage temperature, generally from 1350° C. to 1650° C., so as to reduce the duration of the heating cycle.

At the end of the brazing cycle, after the brazing stage, the assembly is cooled to room temperature, for example at a rate of 5° C. per minute.

During cooling, the braze solidifies.

Surprisingly, the SiC/SiC assemblies brazed in air in accordance with the process of the invention show very little or no porosity, with filling of the joint by the braze that is generally greater than 90% by volume.

The assembly is satisfactory with little or no porosity, both when heating is performed with a rapid temperature rise, i.e. with introduction of the articles to be brazed directly into the already-hot oven, and when a slow temperature rise is performed, i.e. with introduction of the articles to be brazed into a cold oven.

The assemblies of articles made of silicon carbide comprising joints prepared by the process according to the invention make it possible to produce structures, apparatus or components of complex shapes having high working, use, temperatures that may generally be up to 1200° C., with great precision.

Specifically, it is known that the mechanical properties of silicon carbide:
  great hardness;
  low coefficient of expansion;
  high breaking strength;
  good thermal shock strength;
and also its very good conductivity make it an indispensable material for the present and future industrial applications at high temperature.

Furthermore, SiC shows very good chemical resistance to various acids, including hydrofluoric acid, and very good resistance to oxidation in air at high temperature up to 1300° C.

In other words, the process according to the invention may be applied especially to the manufacture of any device, apparatus, structure or component requiring moderately refractory assembly between at least two silicon carbide-based substrates, parts or articles while ensuring both good mechanical strength and satisfactory leaktightness of the assembly.

This type of device, apparatus, structure or component may satisfy needs in various fields:
- the field of heat engineering, especially for designing highly efficient heat exchangers, since silicon carbide has good heat conductivity and good resistance to high temperatures in extreme environments;
- the field of mechanical engineering for producing in embarked devices light, rigid, refractory components that are resistant to abrasion and resistant to mechanical stresses;
- the field of chemical engineering, since silicon carbide is resistant to numerous corrosive chemical products, for instance strong acids and bases;
- the field of nuclear engineering, for the production of sheathing for fuel rods;
- the fields of spatial optics (telescope mirror made of SiC) and of aeronautics (article, part, made of SiC/SiC composite);
- power electronics using SiC.

The invention will now be described by means of the examples that follow, which, needless to say, are given as non-limiting illustrations.

Example 1

This example describes applied drop tests ("Essais de goutte posée" in French) and bond strength tests performed with a brazing alloy or brazing composition according to the invention having the composition: 62% by mass of $SiO_2$-15% by mass of $Al_2O_3$-23% by mass of CaO on sintered pure α-SiC.

a) Preparation of the Brazing Composition

The targeted brazing composition: 62% by mass of $SiO_2$-15% by mass of $Al_2O_3$-23% by mass of CaO, was prepared from $SiO_2$ powder, mullite powder (defined compound $3Al_2O_3$-$2SiO_2$) and powder of the compound CaO—$SiO_2$.

These powders are weighed out, adhering to the proportions, and are then mixed together and ground in a mortar. The powder mixture is then subjected to a stage of 4 hours in air at 1590° C. After cooling, a glass with a melting point of about 1200° C. is obtained. The analyses performed with an X-ray microprobe indicate that the mixture is homogeneous and that the mass composition is 61.2% $SiO_2$-15.0% $Al_2O_3$-23.4% CaO.

The glass obtained is recovered and then crushed in a mortar.

b) "Applied Drop" and Bond Strength Tests

A small piece of the glass prepared as described above, with a mass of between 10 mg and 40 mg, is placed on a silicon carbide substrate.

This substrate and its small piece of glass are introduced into an oven under air and subjected to a heating cycle with a heating stage. The glass melts during this heat treatment and forms a drop referred to as an "applied drop" ("goutte posée" in French).

All the tests performed with stages between 1300° C. and 1590° C. (1300, 1400 and 1590° C.) led to very rapid wetting of the SiC (a few minutes) with contact angles of between 20° and 50°.

Figure 2:
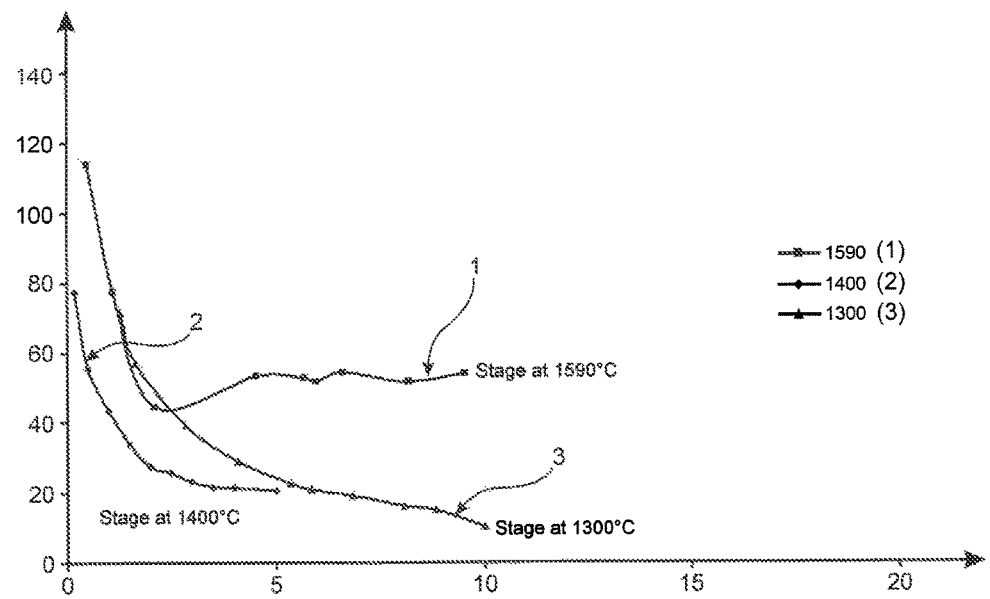
FIG. 2 is a graph that gives the wetting angle (in degrees) as a function of the duration of the heating stage (in minutes) observed in Example 1b). For curve 1, the brazing stage temperature is 1590° C. For curve 2, the brazing stage temperature is 1400° C. For curve 3, the brazing stage temperature is 1300° C.

The results of these tests are given in FIG. 2.

It is also important to note that the SiC/glass bonds thus formed are strong (cohesive break, no cracking at the SiC/glass interface), as may be observed visually in the course of cooling on removal from the oven.

Example 2

This example describes the preparation of bonds or assemblies between two articles made of sintered pure α-SiC silicon carbide, by performing the brazing process according to the invention (brazing in sandwich configuration), and using a brazing composition according to the invention composed of (consisting of) 62% by mass of $SiO_2$-15% by mass of $Al_2O_3$-23% by mass of CaO, and mechanical tests or trials performed on these assemblies.

a) Preparation of the Brazing Composition and of the Articles to be Assembled

The glass is produced according to the procedure described in Example 1. It is then recovered and ground in a mortar. It is then mixed with an organic cement, Nicrobraz®, which is both viscous and tacky, so as to obtain a paste that is easy to spread.

The articles made of sintered SiC are plates 20×20 mm² in size and 1 mm thick or discs 15 mm in diameter and 5 mm thick.

The two SiC surfaces to be assembled are degreased in an organic solvent, and then dried.

The paste is spread uniformly onto the surface of one of the silicon carbide-based substrates, parts or articles to be assembled. The amount applied during this test is about 11 mg/cm², the minimum being 4 mg/cm² and the maximum 17 mg/cm². The substrates or articles are then placed in contact (this configuration is known as the sandwich configuration).

b) Brazing

The articles placed in contact and thus ready to be brazed are placed in an oven and subjected to a brazing heating cycle in air. The assembly obtained is then cooled to room temperature, at a rate of 6° C. per minute.

Various heating cycles were performed:
- A first series was performed by directly introducing the articles into the hot oven at the brazing stage temperature (rapid heating);
- a heating cycle with a brazing stage at 1590° C. for 5 minutes allowed a defect-free homogeneous joint to be obtained;
- similarly, a cycle with a stage at 1590° C. for 10 minutes led to a defect-free homogeneous joint;
- a heating cycle with a brazing stage at 1400° C. for 5 minutes gives a joint that is satisfactorily filled with braze (filling of greater than 90% by volume).
- A second series was performed by introducing the articles into the oven that is initially cold, and then subjecting them to slow heating up to the brazing stage (typically 4 hours to reach the brazing stage);
- under these slow heating conditions, a heating cycle with a brazing stage at 1500° C. for 10 minutes made it possible to obtain a satisfactorily filled homogeneous joint (filling of greater than 90% by volume).

c) Preparation of the Mechanical Test Specimens and Results of the Mechanical Tests Mechanical test specimens are prepared by brazing two articles 15×15×6 mm³ in size (1,2) with the glass paste described above in a).

The specimens are represented schematically in FIG. 1. They are fixed in a mount and subjected to shear (3) at room temperature.

in a first series of tests, five specimens are prepared by brazing with the glass paste described above in a), using a brazing cycle at 1590° C. for 10 minutes.

in a second series of tests, two other mechanical test specimens are prepared with the glass paste described above in b), using a brazing cycle at 1100° C. for 120 minutes.

Results of the mechanical tests:

First series of tests: the breaking stresses determined for each of the five specimens are 43.4 MPa; 23.5 MPa; 45.7 MPa; 32.0 MPa; 65.3 MPa; i.e. an average of 42 MPa.

Second series of tests: the breaking stresses determined for each of the two specimens are 11 MPa and 6 MPa.

Example 3

This example describes the preparation of bonds or assemblies between two articles made of sintered pure α-SiC silicon carbide, by performing the brazing process according to the invention (brazing in capillary configuration) using a brazing composition according to the invention composed of 62% by mass of $SiO_2$-15% by mass of $Al_2O_3$ and 23% by mass of CaO.

a) Preparation of the Brazing Composition and of the Articles to be Assembled

The brazing paste is prepared as described in Example 2. The sintered SiC articles are plates 15×15 mm² in size and 5 mm thick.

The two SiC surfaces to be assembled are degreased in an organic solvent, and then dried.

The substrates or articles are placed in contact with an offset of a few mm so as to leave a space to apply the brazing paste close to the joint (this configuration is known as the capillary configuration). The paste is applied with a spatula to the available surface at the edge of the joint. The amount applied is about 11 mg/cm², the minimum being 4 mg/cm² and the maximum 17 mg/cm².

b) Brazing

The articles, parts, placed in contact and ready to be brazed are placed in an oven and subjected to a brazing heating cycle in air. The articles to be brazed are introduced directly into the hot oven at the brazing stage temperature (rapid heating), i.e: at 1590° C., for 15 minutes. This treatment made it possible to obtain a defect-free homogeneous joint.

Example 4

This example describes the preparation of bonds or assemblies between two articles made of sintered pure α-SiC silicon carbide, by performing the brazing process according to the invention—the brazing being performed in "sandwich configuration"—and using a brazing composition according to the invention composed of (consisting of) 42% by mass of $SiO_2$-20% by mass of $Al_2O_3$ and 38% by mass of CaO.

This example also describes mechanical trials or tests performed on these assemblies.

a) Preparation of the Brazing Composition and of the Articles to be Assembled

The braze having the composition: 42% by mass of $SiO_2$-20% by mass of $Al_2O_3$-38% by mass of CaO, was prepared from alumina powder $Al_2O_3$ and powder of the compound CaO—$SiO_2$. These powders are weighed out, adhering to the proportions, and are then mixed together and ground in a mortar. The powder mixture is then subjected to a stage of 4 hours in air at 1590° C. After cooling, a glass with a melting point of about 1200° C. is obtained.

The glass obtained is recovered and then ground in a mortar. It is then mixed with an organic cement, Nicrobraz®, which is both viscous and tacky, so as to obtain a paste that allows uniform spreading onto the surfaces to be brazed.

The sintered SiC articles are discs 15 mm in diameter with a thickness or height of 5 mm.

The two SiC surfaces to be assembled are degreased in an organic solvent and then dried.

The paste is spread uniformly onto the surface of one of the silicon carbide-based substrates, parts or articles to be assembled. The amount applied during this test is about 11 mg/cm², the minimum being 4 mg/cm² and the maximum 17 mg/cm². The substrates, parts, or articles are then placed in contact (this configuration is known as the sandwich configuration).

b) Brazing

The articles placed in contact and thus ready to be brazed are placed in an oven and subjected to a brazing heating cycle in air. The article to be brazed was introduced directly into the hot oven at the brazing stage temperature (rapid heating), i.e. at 1610° C., for 10 minutes. This treatment allowed a defect-free homogeneous joint to be obtained.

The assembly obtained is then cooled to room temperature, at a rate of 6° C. per minute.

c) Preparation of the Mechanical Test Specimens and Results of the Mechanical Tests Mechanical test specimens are prepared by brazing two articles 15×15×6 mm³ in size with the glass paste described above in a).

The specimens are represented schematically in FIG. 1. They are fixed in a mount and subjected to shear at room temperature.

Two specimens are prepared by brazing with the glass paste described above in a) using a brazing cycle at 1590° C. for 10 minutes.

Results of the Mechanical Tests:

The breaking stresses determined for each of the specimens are 59 MPa and 56 MPa.

Example 5

This example describes the preparation of bonds or assemblies between two articles made of sintered pure α-SiC silicon carbide, by performing the brazing process according to the invention—the brazing being performed in "sandwich configuration"—and using a brazing composition according to the invention composed of (consisting of) 22% by mass of $SiO_2$-37% by mass of $Al_2O_3$ and 41% by mass of CaO.

a) Preparation of the Brazing Composition and of the Articles to be Assembled

The braze having the composition: 22% by mass of $SiO_2$-37% by mass of $Al_2O_3$-41% by mass of CaO, was prepared from powder of the compound CaO—$Al_2O_3$ and powder of the compound CaO—$SiO_2$. These powders are weighed out, adhering to the proportions, and are then mixed together and ground in a mortar. The powder mixture is then subjected to a stage of 4 hours in air at 1640° C. After cooling, a glass with a melting point of about 1600° C. is obtained.

The glass obtained is recovered and then ground in a mortar. It is then mixed with an organic cement, Nicrobraz®, which is both viscous and tacky, so as to obtain a paste that allows uniform spreading onto the surfaces to be brazed.

The sintered SiC articles are discs 15 mm in diameter with a thickness or height of 5 mm.

The two SiC surfaces to be assembled are degreased in an organic solvent and then dried.

The paste is spread uniformly with a brush onto the surface of one of the silicon carbide-based substrates or articles to be assembled. The amount applied during this test is about 11 mg/cm$^2$, the minimum being 4 mg/cm$^2$ and the maximum 17 mg/cm$^2$. The substrates or articles are then placed in contact (this configuration is known as the sandwich configuration).

b) Brazing

The articles placed in contact and thus ready to be brazed are placed in an oven and subjected to a brazing heating cycle in air. The article to be brazed was introduced directly into the hot oven at the brazing stage temperature (rapid heating), i.e. at 1610° C., for 10 minutes. This treatment made it possible to obtain a homogeneous joint that is satisfactorily filled, i.e. with filling of greater than 90% by volume.

The assembly obtained was then cooled to room temperature, at a rate of 6° C. per minute.

Example 6

This example describes the preparation of bonds or assemblies between two articles made of sintered pure α-SiC silicon carbide, by performing the brazing process according to the invention—the brazing being performed in "sandwich configuration"—and using a brazing composition according to the invention composed of (consisting of) 50.5% by mass of $Al_2O_3$, 44% by mass of CaO and 5.5% by mass of MgO.

a) Preparation of the Brazing Composition and of the Articles to be Assembled:

The braze having the composition: 50.5% by mass of $Al_2O_3$-44% by mass of CaO-5.5% by mass of MgO, was prepared from powder of the compound CaO—$Al_2O_3$ and powders of CaO, MgO and $Al_2O_3$. These powders are weighed out, adhering to the proportions, and then mixed together and ground in a mortar. The powder mixture is then subjected to a stage of 4 hours in air at 1590° C. After cooling, a glass with a melting point of about 1350° C. is obtained.

The glass obtained is recovered and then ground in a mortar. It is then mixed with an organic cement, Nicrobraz®, which is both viscous and tacky, so as to obtain a paste that allows uniform spreading onto the surfaces to be brazed.

The sintered SiC articles are discs 15 mm in diameter with a thickness or height of 5 mm.

The two SiC surfaces to be assembled are degreased in an organic solvent and then dried.

The paste is spread uniformly with a spatula onto the surface of one of the silicon carbide-based substrates or articles to be assembled. The amount applied during this test is about 11 mg/cm$^2$, the minimum being 4 mg/cm$^2$ and the maximum 17 mg/cm$^2$. The substrates or articles are then placed in contact (this configuration is known as the sandwich configuration).

b) Brazing

The articles placed in contact and thus ready to be brazed are placed in an oven and subjected to a brazing heating cycle in air. The article to be brazed was introduced directly into the hot oven at the brazing stage temperature (rapid heating), i.e. at 1610° C. for 10 minutes. This treatment made it possible to obtain a homogeneous joint that is satisfactorily filled, i.e. with filling of greater than 90% by volume.

Crystallization at the centre of the joint is noted.

The assembly obtained is then cooled to room temperature, at a rate of 6° C. per minute.

REFERENCES

[1] Hanson W. B., Fernie J. A., Ironside K. I., Ormston D. R., Knowles K. M., *Active metal brazing: the role of the braze alloy*, Proceedings from materials solutions '99 on joining of advanced and specialty materials, p. 53, 1999.

[2] Fernie J. A., Hanson W. B., Ormston D. R., Knowles K. M., Ceramic reinforced Metal braze alloys for joining silicon carbide, British ceramic proceedings, No. 60, p. 317, 1999.

[3] Prakash P., Mohandas T., Dharma Raju P., *Microstructural characterisation of SiC ceramic and SiC-metal active metal brazed joints*, Scripta materialia 52, p. 1169, 2005.

[4] Gasse A., Coing-Boyat G., Bourgeois G., Method using a thick joint for joining parts in SiC-based materials by refractory brazing and refractory thick joint thus obtained, U.S. Pat. No. 5,975,407, 1999.

[5] Montgomery F. C., Streckert H. H., Braze for Silicon Carbide bodies, U.S. Pat. No. 5,447,683, 1995

[6] Gasse A., Method for assembling parts made of materials based on SiC by non-reactive refractory brazing, brazing composition, and joint and assembly obtained by said method, US-A1-2003/0038166.

[7] Lemoine P., Ferraris M., Salvo M, Appendino Montorsi M., *Vitreous Joining Process of SiC$_f$/SiC Composites*, Journal of the European Ceramic Society 22, p. 2343, 2002.

[8] Ferraris M., Salvo M., Isola C., Appendino Montorsi M., Kohyama A., *Glass-ceramic joining and coating of SiC/SiC for fusion applications*, Journal of Nuclear Materials 258-263, p. 1546, 1998.

[9] Katoh Y., Kotani M., Kohyama A., Montorsi M., Salvo. M, Ferraris M., *Microstructure and mechanical properties of low-activation glass-ceramic joining and coating for SiC/SiC composites*, Journal of Nuclear Materials 283-287, p. 1262, 2000.

[10] Drouet C., Minjolle L., Matériaux céramiques vitreux, procédé de fabrication de tels matériaux et application de ces derniers au collage de pièces céramiques [Vitreous ceramic materials, process for manufacturing such materials and application thereof to the bonding of ceramic components], FR-A-2 538 370, 1982.

[11] Perham T. J., De Jonghe L. C., MoberlyChan W. J., *Joining of silicon carbide with a cordierite glass-ceramic*, Journal of the European Ceramic Society 82, p. 297, 1999.

[12] Tamari N., Honda M., Ebata Y., Kinoshita M., *Joining of silicon carbide with $Si_3N_4$—$Y_2O3$-$La_2O_3$—MgO Mixture*, Yogyo-Kyokai-Shi 94 [10], p. 1087, 1986

[13] Lee H. L., Nam S. W., Hahn B. S., *Joining of silicon carbide using MgO—$Al_2O_3$—$SiO_2$ filler*, Journal of Materials Science 33, p. 5007, 1998.

[14] Lippmann W., Knorr J., Wolf R., Rasper R., Exner H., Reinecke A. M., Nieher M., Schreiber R., *Laser Joining of silicon—a new technology for ultra-high temperature*, Nuclear Engineering and Design 33, p. 5007, 1998.

[15] Knorr J., Lippmann W., Wolf R., Exner H., Reinecke A-M., Method for producing by laser gastight and high-temperature resistant connections of shaped parts made of non-oxidic ceramic, US-A1-2005/0167409.

The invention claimed is:

1. A process for moderately refractory assembly of at least two articles made of silicon carbide-based materials by non-reactive brazing in an oxidizing atmosphere, the process consisting of:
placing the at least two articles in contact with a non-reactive brazing composition to form an assembly; and
heating the assembly formed by the at least two articles and the non-reactive brazing composition under an oxidizing atmosphere to a brazing temperature that is sufficient to melt the non-reactive brazing composition in order to form a moderately refractory joint,
wherein said oxidizing atmosphere remains present during said melting of the non-reactive brazing composition, and
wherein, the non-reactive brazing composition is a composition A consisting of silica ($SiO_2$), alumina ($Al_2O_3$) and calcium oxide (CaO) and optionally an addition of titanium oxide or an addition of boron oxide or both, or alternatively a composition B consisting of alumina ($Al_2O_3$), calcium oxide (CaO) and magnesium oxide (MgO) and optionally an addition of titanium oxide or an addition of boron oxide or both.

2. The process according to claim 1, wherein the oxidizing atmosphere is an atmosphere containing oxygen comprising an atmosphere of air, of oxygenated argon or of oxygenated helium.

3. The process according to claim 1, in which composition A is composed, as mass percentages, of 75% to 7% $SiO_2$, 60% to 6% $Al_2O_3$ and 60% to 10% CaO.

4. The process according to claim 3, in which composition A is composed, as mass percentages, of 70% to 55% $SiO_2$, 22% to 8% $Al_2O_3$ and 35% to 15% CaO.

5. The process according to claim 4, in which composition A is composed, as mass percentages, of 62% $SiO_2$, 15% $Al_2O_3$ and 23% CaO.

6. The process according to claim 3, in which composition A is composed, as mass percentages, of 55% to 38% $SiO_2$, 25% to 12% $Al_2O_3$ and 45% to 30% CaO.

7. The process according to claim 6, in which composition A is composed, as mass percentages, of 42% $SiO_2$, 20% $Al_2O_3$ and 38% CaO.

8. The process according to claim 3, in which composition A is composed, as mass percentages, of 38% to 8% $SiO_2$, 55% to 8% $Al_2O_3$ and 55% to 28% CaO.

9. The process according to claim 8, in which composition A is composed, as mass percentages, of 22% $SiO_2$, 37% $Al_2O_3$ and 41% CaO.

10. The process according to claim 1, in which composition B is composed, as mass percentages, of 70% to 35% $Al_2O_3$, 65% to 25% CaO and 20% to 1% MgO.

11. The process according to claim 10, in which composition B is composed, as mass percentages, of 50.5% $Al_2O_3$, 44.0% CaO and 5.5% MgO.

12. The process according to claim 1, in which
the brazing temperature is 1100° C. to 1650° C., and
the heating is performed at the brazing temperature for a time of 1 to 240 minutes.

13. The process according to claim 12, in which
the brazing temperature is 1350° C. to 1650° C., and
the heating is performed at the brazing temperature for a time of 1 to 240 minutes.

14. The process according to claim 12, in which the heating is performed for a time of 2 to 30 minutes.

15. The process according to claim 1, in which the heating of the assembly formed by the at least two articles and the non-reactive brazing composition under the oxidizing atmosphere to the brazing temperature is achieved by introducing the assembly directly into a device already brought to the brazing temperature.

16. The process according to claim 15, in which the device is an oven.

17. The process according to claim 1, in which the heating of the assembly formed by the at least two articles and the non-reactive brazing composition under the oxidizing atmosphere to the brazing temperature is achieved by applying a temperature rise from room temperature.

18. The process according to claim 1, in which the silicon carbide-based materials are selected from among the group consisting of pure silicon carbides and SiC-based composite materials.

19. The process of claim 18, wherein the pure silicon carbides are pure α silicon carbide (α-SiC) or pure β silicon carbide (β-SiC).

20. The process of claim 18, wherein the SiC-based composite materials are a composite material with at least one selected from silicon carbide fibers and a silicon carbide matrix.

21. The process according to claim 1, in which the silicon carbide-based materials are selected from among the group consisting of pressureless sintered silicon carbide (PLS—SiC); Si-infiltrated silicon carbide (SiSiC or RBSC); porous recrystallized silicon carbide (RSiC); silicon graphite (C—SiC) composed of graphite and covered with a layer of SiC; SiC/SiC composites; C/SiC composites; SiC monocrystals; and SiC composites with another ceramic.

22. The process of claim 21, wherein the SiC/SiC composites contain fibers or "whiskers".

23. The process of claim 21, wherein the C/SiC composites contain carbon fibers or "whiskers" and an SiC matrix.

24. The process of claim 21, wherein the SiC composites with another ceramic are $SiC/Si_3N_4$ or SiC/TiN.

25. The process according to claim 1, in which said silicon carbide-based materials have a silicon carbide content at least equal to 50% by mass.

26. The process according to claim 25, in which said silicon carbide-based materials have a silicon carbide content at least equal to 80% by mass.

27. The process according to claim 26, in which said silicon carbide-based materials have a silicon carbide content equal to 100% by mass.

28. The process of claim 1, wherein the at least two articles are shaped articles.

* * * * *